(12) United States Patent
Tangirala et al.

(10) Patent No.: US 11,588,752 B2
(45) Date of Patent: Feb. 21, 2023

(54) ROUTE EXCHANGE IN MULTI-TENANT CLUSTERED CONTROLLERS

(71) Applicant: Cisco Technology, Inc., San Jose, CA (US)

(72) Inventors: Srilatha Tangirala, San Jose, CA (US); Nithin Bangalore Raju, Santa Clara, CA (US); Ananya Raval, Ottawa (CA); Prabahar Radhakrishnan, Dublin, CA (US); Vivek Agarwal, Campbell, CA (US); Balaji Sundararajan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 19 days.

(21) Appl. No.: 17/389,003

(22) Filed: Jul. 29, 2021

(65) Prior Publication Data

US 2022/0329540 A1    Oct. 13, 2022

Related U.S. Application Data

(60) Provisional application No. 63/172,500, filed on Apr. 8, 2021.

(51) Int. Cl.
| | |
|---|---|
| *H04L 47/80* | (2022.01) |
| *H04L 47/70* | (2022.01) |
| *H04L 45/64* | (2022.01) |
| *H04L 45/02* | (2022.01) |
| *H04L 47/762* | (2022.01) |
| *H04L 47/78* | (2022.01) |

(52) U.S. Cl.
CPC ............ *H04L 47/805* (2013.01); *H04L 45/02* (2013.01); *H04L 45/64* (2013.01); *H04L 47/762* (2013.01); *H04L 47/781* (2013.01); *H04L 47/825* (2013.01)

(58) Field of Classification Search
CPC ....... H04L 47/805; H04L 45/02; H04L 45/64; H04L 45/586; H04L 47/762; H04L 47/781; H04L 47/825; G06F 9/455
See application file for complete search history.

(56) References Cited

U.S. PATENT DOCUMENTS 9,912,582 B2 *   3/2018   Pourzandi ............... H04L 45/44
2015/0139238 A1   5/2015   Pourzandi et al.
(Continued)

*Primary Examiner* — Mohamed A Kamara
(74) *Attorney, Agent, or Firm* — Polsinelli

(57) ABSTRACT

Route exchange in a plurality of network controller appliances on a per-tenant basis is disclosed. In one aspect, a method includes receiving, from a network management system and at a first network controller appliance, a designation of at least two tenants to be hosted on the first network controller appliance, the first network controller appliance being one of a plurality of network controller appliances in a SD-WAN; sending, from the first network controller appliance to other network controller appliances of the plurality of network controller appliances, a tenant list query message to obtain a corresponding tenant list of each of the other network controller appliances; and receiving a corresponding response from each of the other network controller appliances indicating the corresponding tenant list of each of the other network controller appliances, the corresponding response being used to update the tenant list on the first network controller appliance.

20 Claims, 8 Drawing Sheets

(56) References Cited

U.S. PATENT DOCUMENTS

| | | |
|---|---|---|
| 2017/0279689 A1* | 9/2017 | Mohan .................... H04L 45/38 |
| 2018/0173557 A1 | 6/2018 | Nakil et al. |
| 2019/0103993 A1 | 4/2019 | Cidon et al. |
| 2020/0134207 A1 | 4/2020 | Doshi et al. |
| 2020/0162917 A1 | 5/2020 | Anantha et al. |
| 2021/0377164 A1* | 12/2021 | Sanghvi ................ H04L 45/586 |

* cited by examiner

ROUTE EXCHANGE IN MULTI-TENANT CLUSTERED CONTROLLERS

CROSS-REFERENCE TO RELATED APPLICATIONS

This application claims the benefit of, and priority to, U.S. Provisional Patent Application No. 63/172,500, filed on Apr. 8, 2021, entitled "Route Exchange in Multi-Tenant Clustered Controllers", the contents of which are incorporated herein by reference in their entirety.

TECHNICAL FIELD

The present disclosure relates to the field of software-defined wide-area networks (SD-WANs) and more specifically to improving multi-tenancy at network controller appliances in SD-WANs.

DESCRIPTION OF THE RELATED TECHNOLOGY

The enterprise network landscape is continuously evolving. There is a greater demand for mobile and Internet of Things (IoT) device traffic, Software as a Service (SaaS) applications, and cloud adoption. In addition, security needs are on the rise and certain applications can require prioritization and optimization for proper operation. As this complexity grows, there is a push to reduce costs and operating expenses while providing for high availability and scale.

Conventional WAN architectures are facing major challenges under this evolving landscape. Conventional WAN architectures typically consist of multiple Multi-Protocol Label Switching (MPLS) transports, or MPLS paired with Internet or Long-Term Evolution (LTE) links used in an active/backup fashion, most often with Internet or SaaS traffic being backhauled to a central data center or regional hub for Internet access. Issues with these architectures can include insufficient bandwidth, high bandwidth costs, application downtime, poor SaaS performance, complex operations, complex workflows for cloud connectivity, long deployment times and policy changes, limited application visibility, and difficulty in securing the network.

In recent years, software-defined wide-area network (SD-WAN) solutions have been developed to address these challenges. SD-WAN is part of a broader technology of software-defined networking (SDN). SDN is a centralized approach to network management which can abstract away the underlying network infrastructure from its applications. This de-coupling of data plane forwarding and control plane can allow a network operator to centralize the intelligence of the network and provide for more network automation, operations simplification, and centralized provisioning, monitoring, and troubleshooting. SD-WAN can apply these principles of SDN to the WAN.

Small and medium enterprises may take advantage of SD-WAN via multi-tenancy at network controller appliances. As such, in a multi-tenancy configuration, each network controller appliance may share a tenant, such as a customer network, and have required communication with a centralized network management system to learn which other network controller appliances share the tenant. Thus, the centralized network management system needs to maintain an up-to-date per-tenant network controller appliance peer list. Maintaining a plurality of lists of the various multi-tenant clusters by a separate centralized network management system may be laborious and cumbersome on the SD-WAN.

DETAILED DESCRIPTION

Figure 1:
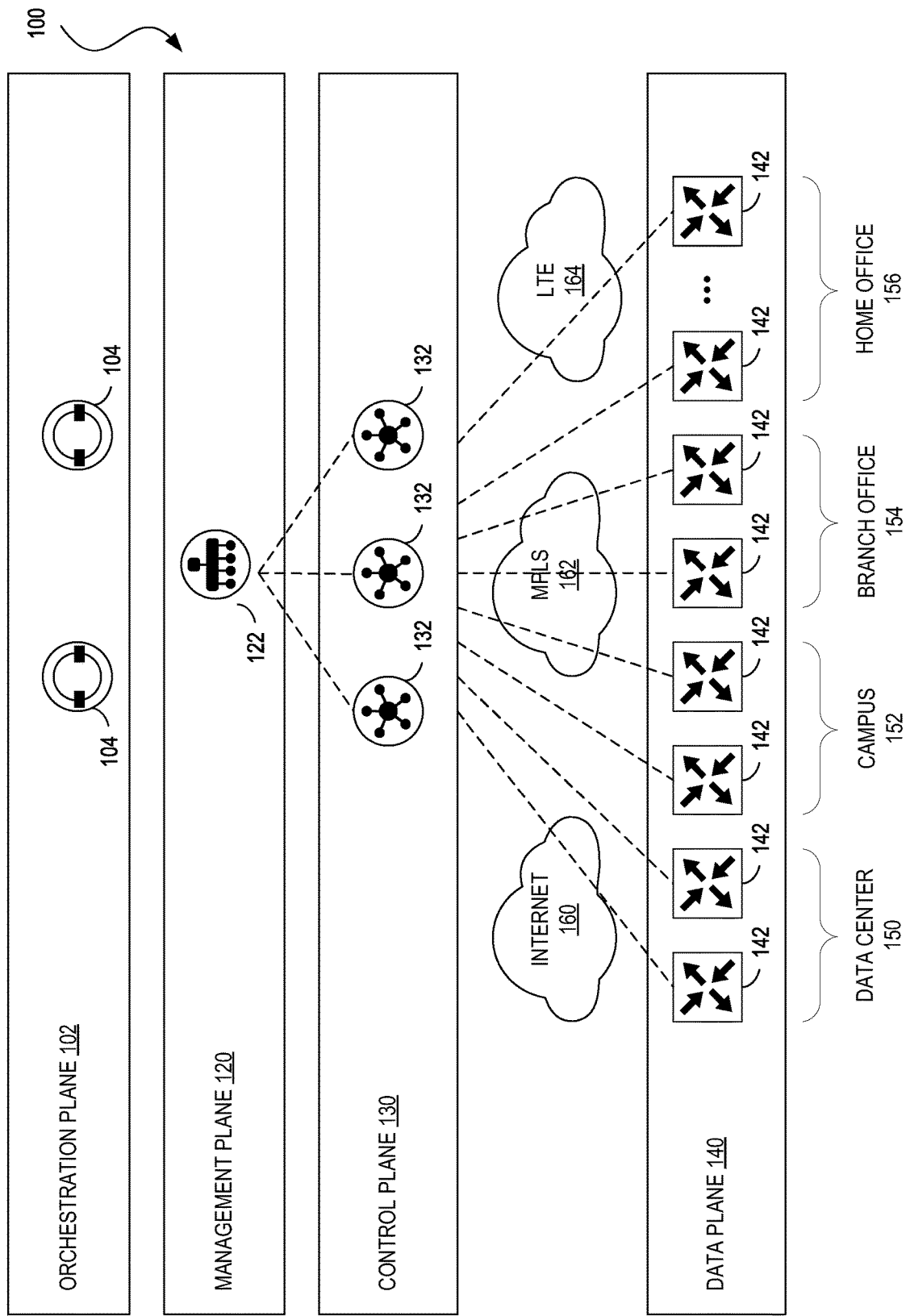
FIG. 1 illustrates an example of a high-level network architecture in accordance with some aspects of the present disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems, methods, and computer-readable media are provided for supporting route exchange in a plurality of network controller appliances on a per-tenant basis.

In one aspect, a method includes receiving, from a network management system and at a first network controller appliance, a designation of at least two tenants to be hosted on the first network controller appliance, the first network controller appliance being one of a plurality of network controller appliances in a Software-Defined Wide Area Network (SD-WAN), the first network controller appliance having a tenant list identifying the at least two tenants hosted on the first network controller appliance; sending, from the first network controller appliance to other network controller appliances of the plurality of network controller appliances, a tenant list query message to obtain a corresponding tenant list of each of the other network controller appliances; and receiving a corresponding response from each of the other network controller appliances indicating the corresponding tenant list of each of the other network controller appliances, the corresponding response being used to update the tenant list on the first network controller appliance to yield an updated tenant list.

In some aspects, the corresponding response from each of the other network controller appliances includes a current list of tenants hosted on a corresponding one of the other network controller appliances, a corresponding tenant digest list, and a corresponding tenant count.

In some aspects, the sending of the tenant list query message is triggered when a new tenant is added to one of the plurality of network controller appliances or when an existing tenant is deleted from one of the plurality of network controller appliances.

In some aspects, the tenant list query message is sent periodically.

In some aspects, the method further includes creating, for each of the at least two tenants, a corresponding workflow between corresponding edge devices of each tenant and at least two network controller appliances assigned to each tenant, the corresponding workflow being used for exchange of network traffic to and from devices associated with a corresponding one of the at least two tenants.

In some aspects, the method further includes forming connections, by a network controller, for each tenant in the updated tenant list to facilitate an exchange of routing information, wherein a second network controller in a global namespace is multi-tenant aware and is configured to multiplex and demultiplex overlay management protocols (OMP) packets; and performing an OMP exchange of the connections among the plurality of network controller appliances.

In some aspects, a first tenant is configured to implement a first topology and a second tenant is configured to implement a second different topology.

In another aspect, a network controller includes one or more memories having computer-readable instructions stored therein and one or more processors. The one or more processors configured to execute the computer-readable instructions to receive, from a network management system, a designation of at least two tenants to be hosted on the network controller, the network controller being one of a plurality of network controllers in a Software-Defined Wide Area Network (SD-WAN), the network controller having a tenant list identifying the at least two tenants hosted on the network controller; send, to other network controllers of the plurality of network controllers, a tenant list query message to obtain a corresponding tenant list of each of the other network controllers; and receive a corresponding response from each of the other network controllers indicating the corresponding tenant list of each of the other network controllers, the corresponding response being used to update the tenant list on the network controller to yield an updated tenant list.

In another aspect, one or more non-transitory computer-readable media includes computer-readable instructions, which when executed by a network controller, cause the network controller to receive, from a network management system, a designation of at least two tenants to be hosted on the network controller, the network controller being one of a plurality of network controllers in a Software-Defined Wide Area Network (SD-WAN), the network controller having a tenant list identifying the at least two tenants hosted on the network controller; send, to other network controllers of the plurality of network controllers, a tenant list query message to obtain a corresponding tenant list of each of the other network controllers; and receive a corresponding response from each of the other network controllers indicating the corresponding tenant list of each of the other network controllers, the corresponding response being used to update the tenant list on the network controller to yield an updated tenant list.

Example Embodiments

As noted above, enterprises, of all sizes, may utilize SD-WANs via multi-tenancy at network controller appliances. As such, in a multi-tenancy configuration, each network controller appliance (which may also be referred to simply as a network controller through description below) may share a tenant, such as a customer network, and have required communication with a centralized network management system to learn which other network controller appliances share the tenant. Thus, the centralized network management system needs to maintain an up-to-date per-tenant network controller appliance peer list. Maintaining a plurality of lists of the various multi-tenant clusters by a separate centralized network management system may be laborious and cumbersome on the SD-WAN.

The present disclosure addresses this issue with centralized network management systems by providing an optimized and scalable architecture wherein a number of tenants may be assigned to a cluster of network controllers (e.g., vSmarts) in a SD-WAN, where each tenant is assigned to at least two network controllers from among the plurality of network controllers. Thereafter, a tenant list query message may be periodically sent, from each network controller to other network controller of the plurality of network controller to obtain corresponding tenant digest list of each of the other network controller appliances. A corresponding response may then be received from each of the other network controllers indicating the corresponding tenant digest list of each of the other network controller. The tenant digest list is then used for network traffic routing as will be further described below.

Example systems and architectures in which the proposed solutions of this disclosure may be utilized are described with reference to FIGS. 1-4. Thereafter, example embodiments of the proposed solution of the present disclosure will be described with reference to FIGS. 5-7. The disclosure concludes with description of example system and device components that may be utilized as part of the example network structure of the present disclosure in FIG. 8.

FIG. 1 illustrates an example of a high-level network architecture in accordance with some aspects of the present disclosure. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
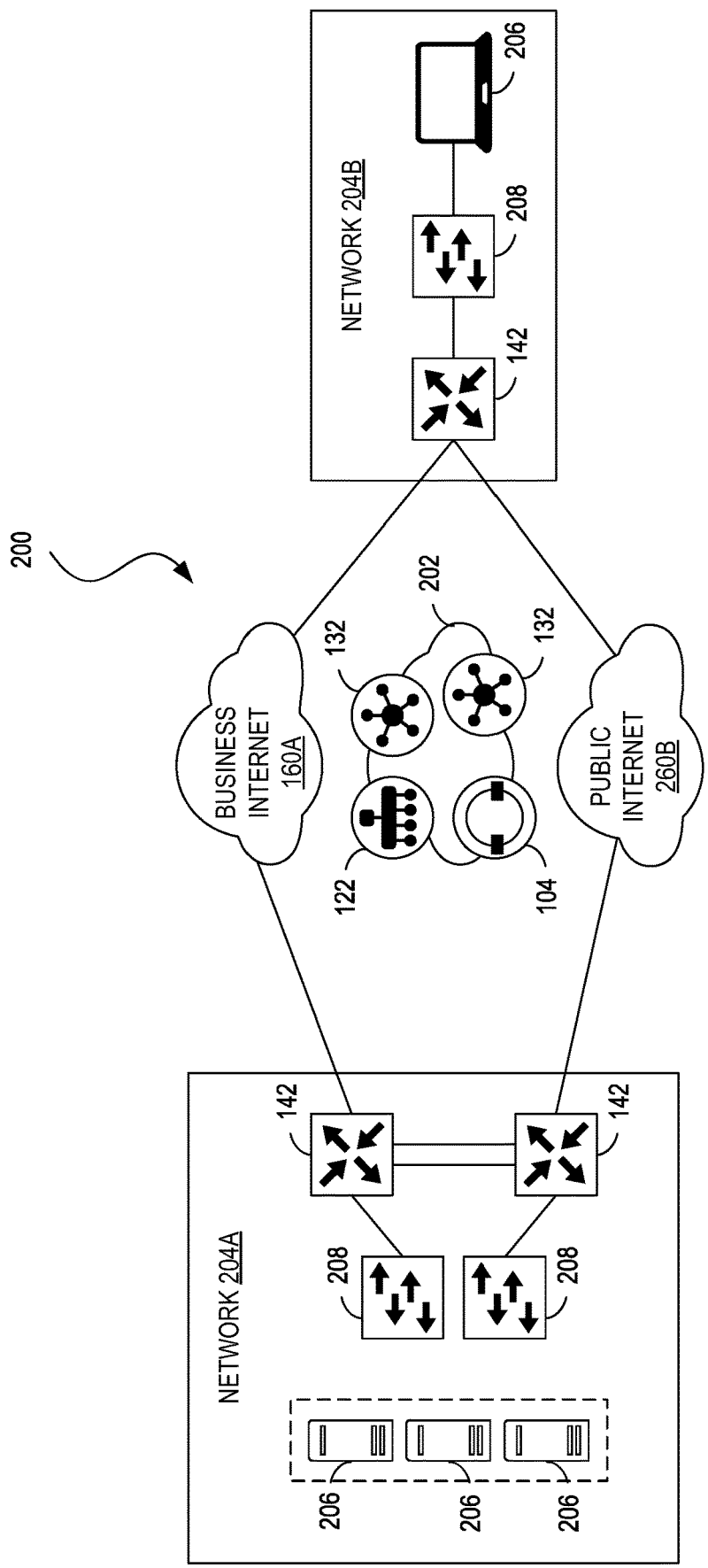
FIG. 2 illustrates an example of a network topology in accordance with some aspects of the present disclosure.

FIG. 2 illustrates an example of a network topology in accordance with some aspects of the present disclosure. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMOs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3 g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
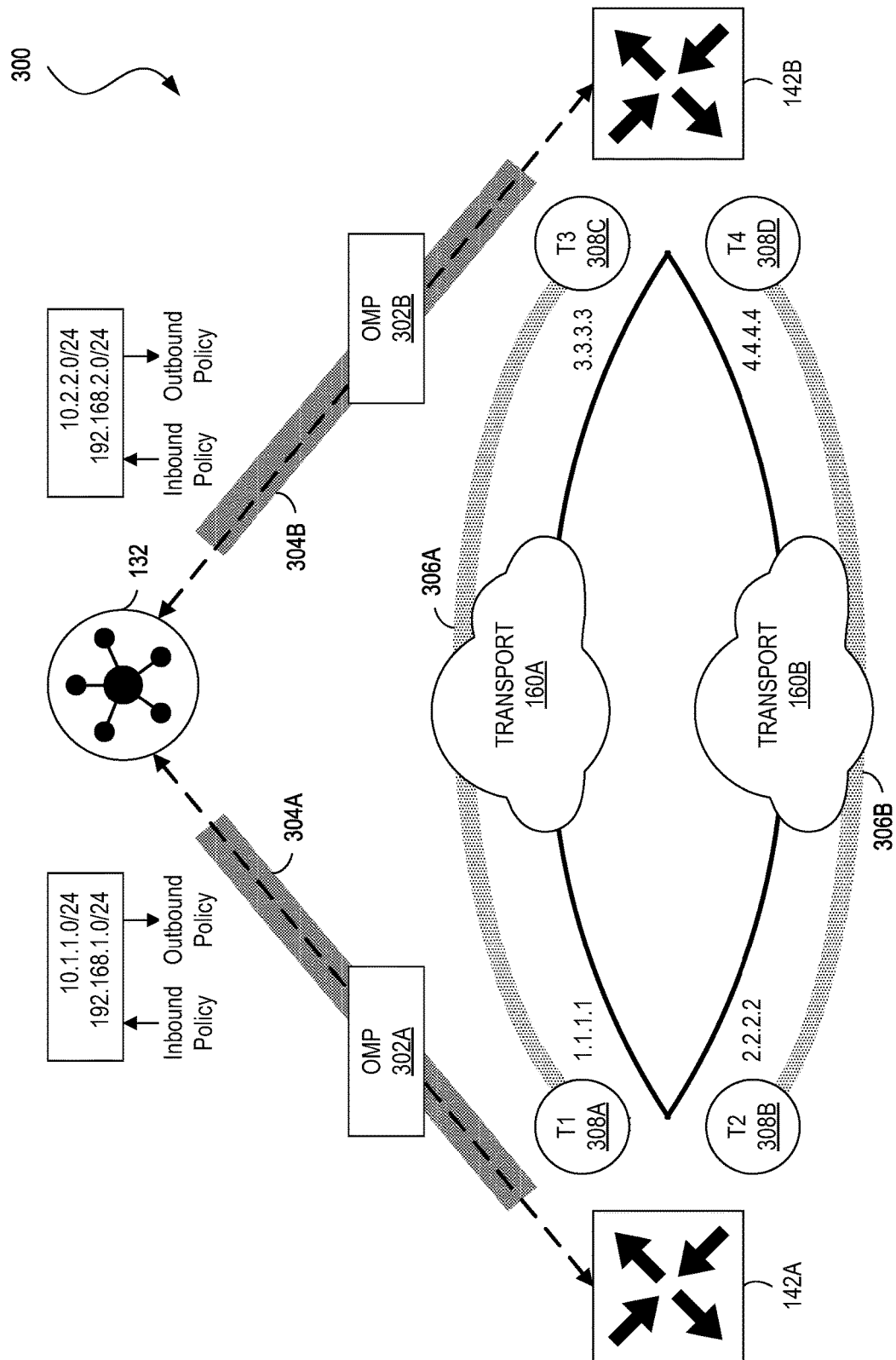
FIG. 3 illustrates an example of a diagram showing the operation of a protocol for managing an overlay network in accordance with some aspects of the present disclosure.

FIG. 3 illustrates an example of a diagram showing the operation of a protocol for managing an overlay network (e.g., the network architecture 100) in accordance with some aspects of the present disclosure. In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:

OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
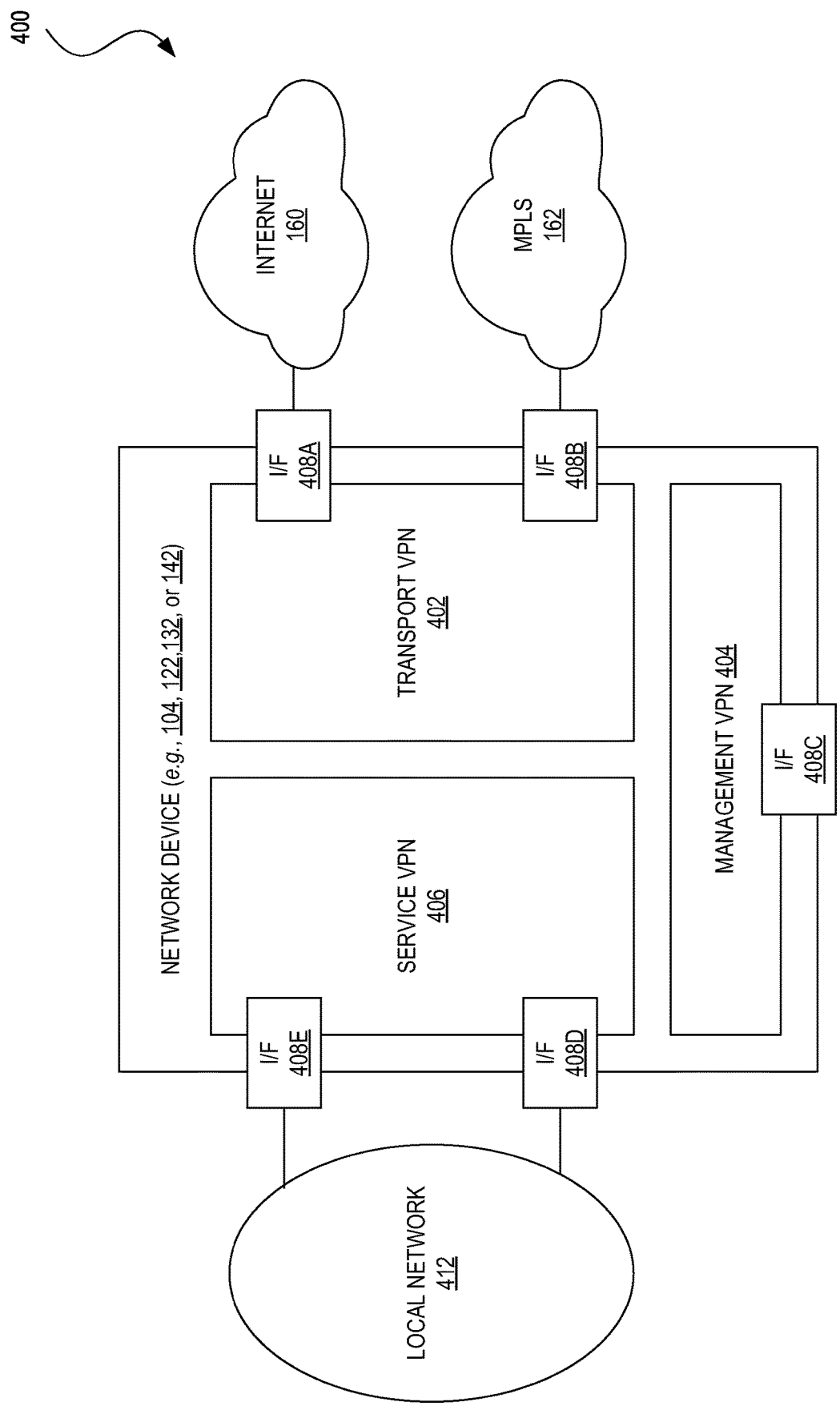
FIG. 4 illustrates an example of a diagram showing the operation of virtual private networks for segmenting a network in accordance with some aspects of the present disclosure.

FIG. 4 illustrates an example of a diagram showing the operation of virtual private networks for segmenting a network in accordance with some aspects of the present disclosure. The diagram shows the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 408A and 408B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 408C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 408D and 408E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 408A-E (collectively, 408) are shown to be physical interfaces in this example, one of ordinary skill in the art will appreciate that the interfaces 408 in the transport and service VPNs can also be sub-interfaces instead.

Figure 5:
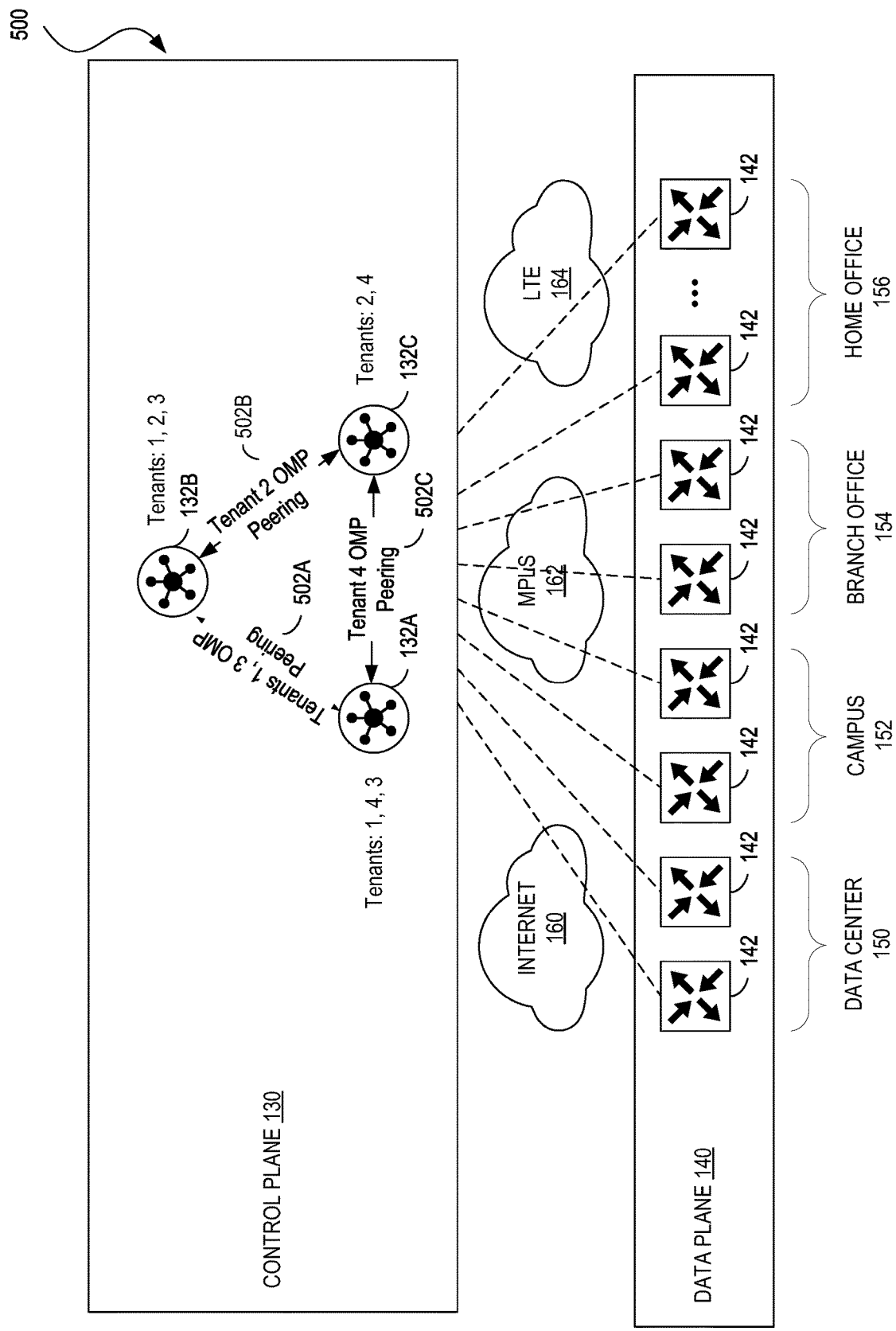
FIG. 5 illustrates an example of a partial high-level network architecture in accordance with some aspects of the present disclosure.

FIG. 5 illustrates an example of a partial high-level network architecture in accordance with some aspects of the present disclosure. The control plane 130 can include a cluster of network controller appliances (collectively, 132, which may also be referred to as simply network controllers), including, for example, a first network controller appliance 132A, a second network controller appliance 132B, a third network controller appliance 132C. These network controller appliances may be the same as network controller appliances 132 described above with reference to FIGS. 1-4. Furthermore, while FIG. 5 illustrates an example of three network controller appliances, the present disclosure is not limited thereto and the architecture 500 can include any number of network controller appliances equal to or greater than two. The cluster of network controller appliances 132 may support route exchange on a per-tenant basis. A tenant may be a customer (e.g., an enterprise subscribing to or utilizing SD-WAN services offered by the SD-WAN service provider such as Cisco, Inc. of San Jose, Calif.).

In a multi-tenant configuration, multiple tenants may be placed on any given network controller appliance. Conversely, each tenant can be hosted on a cluster of network controller appliances as well, for redundancy and load balancing. Peering connections may exist between network controller appliances for route exchange. In some instances, routes may be exchanged between OMP processes running on the network controller appliances.

In a multi-tenant configuration, there may be multiple OMP processes, one per tenant running in a per-tenant namespace. Some other processes, such as processes run by a daemon, (e.g., Cisco® SD-WAN vDaemons), which may also be referred to as a network controller, may run in a global namespace and are multi-tenant aware and may be configured to multiplex and/or demultiplex OMP packets. With multi-tenancy, the routes may be exchanged between the multiple OMP processes in the cluster of network controller appliances at a per-tenant basis, and the daemon may form connections that facilitate the exchange.

As shown in FIG. 5, in a multi-tenant configuration there may be, for example Tenant 1, Tenant 2, and Tenant 3 hosted on the first network controller appliance 132A, the second network controller appliance 132B, the third network controller appliance 132C in various combinations. For example, tenants 1, 4, and 3 may be hosted on network controller appliance 132A, tenants 1, 2, and 3 may be hosted on network controller appliance 132B, and tenants 2 and 4 may be hosted on network controller appliance 132C. Control connections via per-tenant OMP peering 502 may be formed between any given pair of network controller appliances to exchange OMP routes for tenants that each given pair of network controller appliances share. As an example, OMP Peering for Tenants 1 and 3 (Tenants 1, 3 OMP Peering 502A) may be formed between the first network controller appliance 132A and the second network controller appliance 132B. As another example, OMP Peering for Tenant 2 (Tenant 2 OMP Peering 502B) may be formed between the second network controller appliance 132B and the third network controller appliance 132C. As another example, OMP Peering for Tenant 4 (Tenant 4 OMP Peering 502C) may be formed between the third network controller appliance 132C and the first network controller appliance 132A.

In such a multi-tenant configuration, the necessity to maintain per-tenant peer list for each network controller appliance 132 is eliminated and as such is more efficient, and converges faster. Each tenant may be placed in an unequal number of network controller appliances 132, depending on the scale of that tenant and the load-balancing/redundancy requirements, thus permitting elasticity in terms of how the tenants are placed. As an example, one tenant can be placed on two of the network controller appliances 132, whereas another can be placed on four network controller appliances 132. The full mesh of OMP peers can be formed depending on the tenant, and allowing for this elasticity.

As such, the network controller appliances 132 can exchange the routes and the policy enforcement on a per-tenant and per-VPN basis. This allows tenants to configure and implement different topologies, e.g. a first tenant could implement a Hub and Spoke topology, while a second tenant could implement a full mesh topology.

Figure 6:
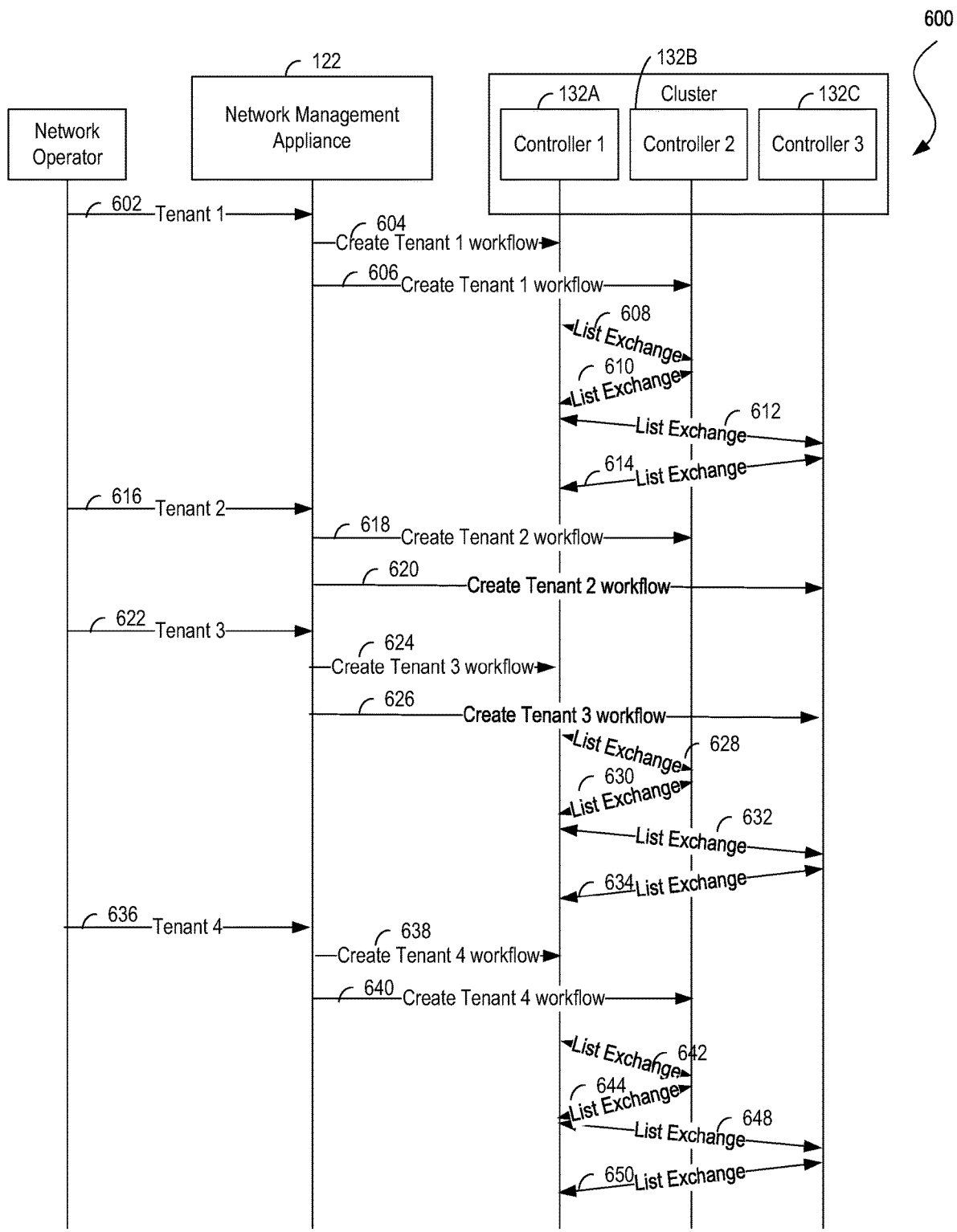
FIG. 6 illustrates an example flow diagram of periodic tenant list query exchanges between controllers for updating tenant digest lists in a cluster of network controller appliances in accordance with some aspects of the present disclosure.

FIG. 6 illustrates an example flow diagram of periodic tenant list query exchanges between controllers for updating tenant digest lists in a cluster of network controller appliances in accordance with some aspects of the present disclosure. FIG. 6 illustrates a diagram 600 of periodic tenant list query exchanges between controllers for updating tenant digest lists in a cluster of network controller appliances. Tenant 1 may be added (602) for network management to the network management appliance 122. The network management appliance 122 may create (604) a Tenant 1 workflow for the first network controller appliance 132A and may also create (606) a Tenant 1 workflow for the second network controller appliance 132B. Then, list exchanges 608, 610 notify the first network controller appliance 132A and the second network controller appliance 132B that Tenant 1 is also hosted by the other network controller appliance, while list changes 612, 614 indicate that the third network controller appliance 132C does not host Tenant 1.

Tenant 2 may be added (616) for network management to the network management appliance 122. The network management appliance 122 may create (618) a Tenant 2 workflow for the second network controller appliance 132B and may also create (620) a Tenant 2 workflow for the third network controller appliance 132C.

Tenant 3 may be added (622) for network management to the network management appliance 122. The network management appliance 122 may create (624) a Tenant 3 workflow for the first network controller appliance 132A and may also create (626) a Tenant 3 workflow for the third network controller appliance 132C. Then, list exchanges 628, 630 notify the second network controller appliance 132B does not host Tenant 3, while list exchanges 632, 634 notify the first network controller appliance 132A and the third network controller appliance 132C that Tenant 3 is also hosted by the other network controller appliance.

Tenant 4 may be added (636) for network management to the network management appliance 122. The network management appliance 122 may create (638) a Tenant 4 workflow for the first network controller appliance 132A and may also create (640) a Tenant 4 workflow for the second network controller appliance 132B. Then, list exchanges 642, 644 notify the first network controller appliance 132A and the second network controller appliance 132B that Tenant 4 is also hosted by the other network controller appliance, while list changes 648, 650 indicate that the third network controller appliance 132C does not host Tenant 1.

Figure 7:
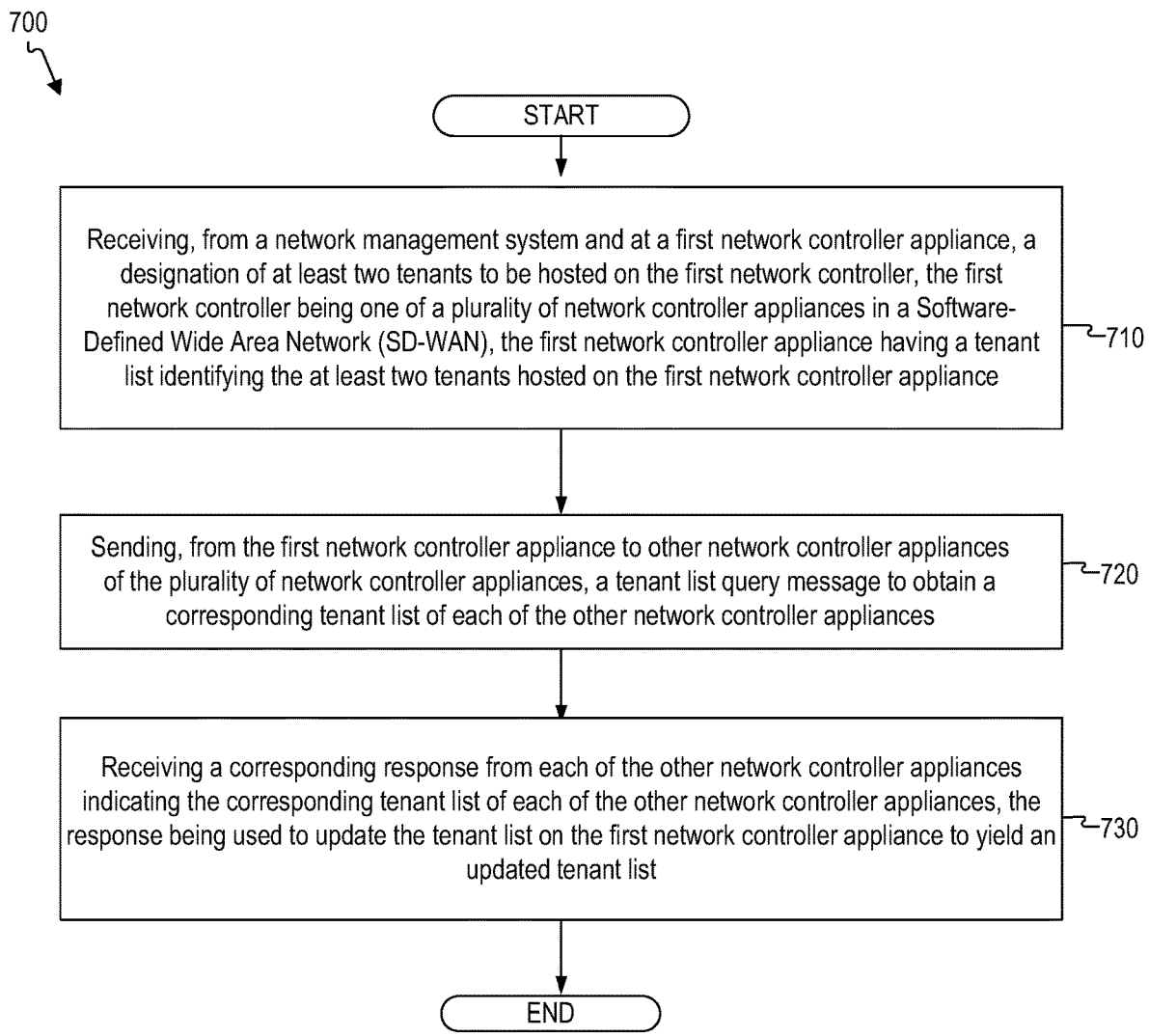
FIG. 7 illustrates an example method for supporting route exchange in a cluster of network controller appliances on a per-tenant basis in accordance with some aspects of the present disclosure.

FIG. 7 illustrates an example method for supporting route exchange in a cluster of network controller appliances on a per-tenant basis in accordance with some aspects of the present disclosure. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence. The process of FIG. 7 will be described from the perspective of network controller appliance 132A. However, the process of FIG. 7 can be equally carried out by any of the other network controller appliances 132B and/or 132C. Furthermore, each network controller appliance may be implemented on a device where a set of computer-readable instructions stored on a corresponding memory (or memories) are executed by one or more processors to carried out the functionalities described below.

According to some examples, the method includes receiving, from a network management system and at a first network controller appliance, a designation of at least two tenants to be hosted on the first network controller, the first network controller being one of a plurality of network controller appliances in a Software-Defined Wide Area Network (SD-WAN), the first network controller appliance having a tenant list identifying the at least two tenants hosted on the first network controller appliance at step 710. For example, the network controller appliance 132A may receive, from a network management system (e.g., network management appliance 122), a designation of at least two tenants to be hosted on the network controller appliance 132A (e.g., tenant 1, 3, and 4 per example of FIG. 5). In some examples, the designation may include identification of new tenants or deletion or removal of an existing tenant from the corresponding network controller appliance such as the network controller appliance 132A.

According to some examples, the method includes sending, from the first network controller appliance to other network controller appliances of the plurality of network controller appliances, a tenant list query message to obtain a corresponding tenant list of each of the other network controller appliances at step 720. For example, the network controller appliance 132A may send, to other network controller appliances (e.g., network controller appliances 132B and/or 132C), a message to obtain a corresponding tenant list of each of the network controller appliances 132B and/or 132C. In some examples, the sending of the tenant list query message is triggered when a new tenant is added to one of the network controller appliances 132A, 132B, and/or 132C or when an existing tenant is deleted from one of the network controller appliances 132A, 132B, and/or 132C. In some examples, the tenant list query message is sent periodically (e.g., every predetermined period of time such as 5 seconds, 10 seconds, etc.). The periodicity may be a configurable parameter determined based on experiments and/or empirical studies.

According to some examples, the method includes receiving a corresponding response from each of the other network controller appliances indicating the corresponding tenant list of each of the other network controller appliances, the response being used to update the tenant list on the first network controller appliance to yield an updated tenant list at step 730. For example, the network controller appliance 132A may receive a corresponding response from each of the other network controller appliances 132B and/or 132C indicating the correspond tenant list (e.g., a current tenant list) for each of the other network controller appliances (e.g., a tenant list including tenants 1, 2, and 3 on the network controller appliance 132B and a tenant list including tenants 2 and 4 on the network controller appliance 132C), a corresponding tenant digest list, and a corresponding tenant count hosted on that network controller appliance (e.g., the network controller appliance 132B and/or 132C). The response can then be used by the network controller appliance 132A to update its to yield an updated tenant list that identifies all tenants of all network controller appliances.

According to some examples, the method includes creating, for each of the at least two tenants, a corresponding workflow between corresponding edge devices of each tenant and at least two network controller appliances assigned to each tenant, the corresponding workflow being used for exchange of network traffic to and from devices associated with a corresponding one of the at least two tenants. For example, the network controller appliances 132A may create, for each of the at least two tenants (e.g., tenants 1, 3, and/or 4), a correspond workflow between corresponding edge devices of each tenant and at least two network controller appliances assigned to each tenant (e.g., the network controller appliances 132A and 132B for tenants 1 and 3, the network controller appliances 132A and 132C for tenant 4, etc.). The corresponding workflow can be used for exchange of network traffic to and from devices associated with a corresponding one of the at least two tenants using corresponding OMP processes, as described above.

According to some examples, the method includes forming connections, by a network controller, for each tenant in the updated tenant list to facilitate an exchange of routing information. For example, the network controller appliance 132A may form connections for each tenant in the updated tenant list to facilitate an exchange of route information. In some examples, a second network controller in a global namespace (e.g., a vdeamon as described above) is multi-tenant aware and is configured to multiplex and demultiplex overlay management protocols (OMP) packets. In some examples, a first tenant is configured to implement a first topology (e.g., a hub and spoke topology) and a second tenant is configured to implement a second different topology (e.g., a full mesh topology).

According to some examples, the method includes performing an OMP exchange of the connections among the plurality of network controller appliances. For example, the network controller appliances 132A, 132B, 132C illustrated in FIGS. 5 and 6 may perform an OMP exchange of the connections among themselves.

With various examples of proposed solutions of the present disclosure described above with reference to FIGS. 1-7, next various non-limiting examples of computing systems will be described with reference to FIG. 8.

Figure 8:
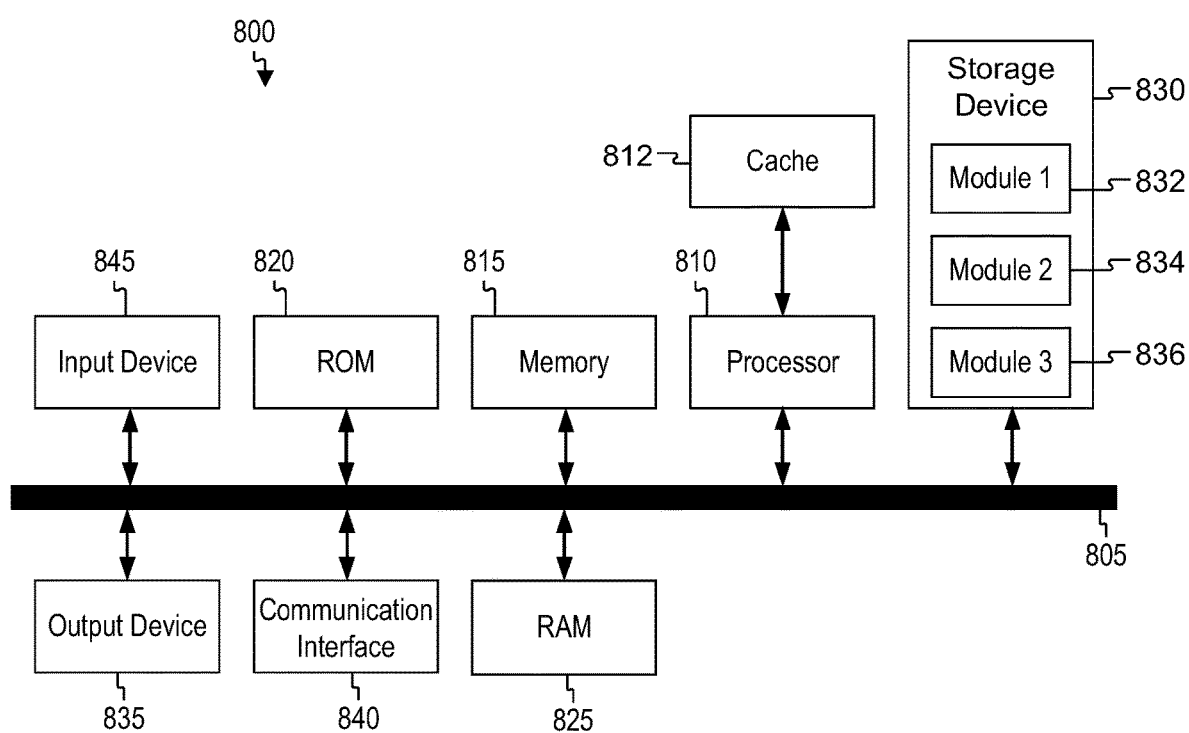
FIG. 8 shows an example of a computing system in accordance with some aspects of the present disclosure.

FIG. 8 shows an example of computing system 800, which can be for example any computing device making up the network controller appliances 132A, 132B, 132C, the network management appliance 122, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    receiving, from a network management system and at a first network controller appliance, a designation of at least two tenants to be hosted on the first network controller appliance, the first network controller appliance being one of a plurality of network controller appliances in a Software-Defined Wide Area Network (SD-WAN), the first network controller appliance having a tenant list identifying the at least two tenants hosted on the first network controller appliance;
    sending, from the first network controller appliance to other network controller appliances of the plurality of network controller appliances, a tenant list query message to obtain a corresponding tenant list of each of the other network controller appliances; and
    receiving a corresponding response from each of the other network controller appliances indicating the corresponding tenant list of each of the other network controller appliances, the corresponding response being used to update the tenant list on the first network controller appliance to yield an updated tenant list.

2. The method of claim 1, wherein the corresponding response from each of the other network controller appliances includes a current list of tenants hosted on a corresponding one of the other network controller appliances, a corresponding tenant digest list, and a corresponding tenant count.

3. The method of claim 1, wherein the sending of the tenant list query message is triggered when a new tenant is added to one of the plurality of network controller appliances or when an existing tenant is deleted from one of the plurality of network controller appliances.

4. The method of claim 1, wherein the tenant list query message is sent periodically.

5. The method of claim 1, further comprising:
    creating, for each of the at least two tenants, a corresponding workflow between corresponding edge devices of each tenant and at least two network controller appliances assigned to each tenant, the corresponding workflow being used for exchange of network traffic to and from devices associated with a corresponding one of the at least two tenants.

6. The method of claim 1, comprising:
    forming connections, by a network controller, for each tenant in the updated tenant list to facilitate an exchange of routing information, wherein a second network controller in a global namespace is multi-tenant aware and is configured to multiplex and demultiplex overlay management protocols (OMP) packets; and
    performing an OMP exchange of the connections among the plurality of network controller appliances.

7. The method of claim 1, wherein a first tenant is configured to implement a first topology and a second tenant is configured to implement a second different topology.

8. A network controller comprising:
    one or more memories having computer-readable instructions stored therein; and
    one or more processors configured to execute the computer-readable instructions to:
        receive, from a network management system, a designation of at least two tenants to be hosted on the network controller, the network controller being one of a plurality of network controllers in a Software-Defined Wide Area Network (SD-WAN), the network controller having a tenant list identifying the at least two tenants hosted on the network controller;
        send, to other network controller appliances of the plurality of network controllers, a tenant list query message to obtain a corresponding tenant list of each of the other network controllers; and
        receive a corresponding response from each of the other network controllers indicating the corresponding tenant list of each of the other network controllers, the response corresponding being used to update the tenant list on the network controller to yield an updated tenant list.

9. The network controller of claim 8, wherein the corresponding response from each of the other network controllers includes a current list of tenants hosted on a corresponding one of the other network controllers, a corresponding tenant digest list, and a corresponding tenant count.

10. The network controller of claim 9, wherein the network controller is configured to send the tenant list query message when a new tenant is added to one of the plurality of network controllers or when an existing tenant is deleted from one of the plurality of network controllers.

11. The network controller of claim 9, wherein the tenant list query message is sent periodically.

12. The network controller of claim 9, wherein the one or more processor are configured to execute the computer-readable instructions to:
create, for each of the at least two tenants, a corresponding workflow between corresponding edge devices of each tenant and at least two network controllers assigned to each tenant, the corresponding workflow being used for exchange of network traffic to and from devices associated with a corresponding one of the at least two tenants.

13. The network controller of claim 9, wherein the one or more processor are configured to execute the computer-readable instructions to:
form connections, by a second network controller, for each tenant in the updated tenant list to facilitate an exchange of routing information, wherein the second network controller in a global namespace is multi-tenant aware and is configured to multiplex and demultiplex overlay management protocols (OMP) packets; and
performing an OMP exchange of the connections among the plurality of network controllers.

14. The network controller of claim 9, wherein a first tenant is configured to implement a first topology and a second tenant is configured to implement a second different topology.

15. One or more non-transitory computer-readable media comprising computer-readable instructions, which when executed by a network controller, cause the network controller to:
receive, from a network management system, a designation of at least two tenants to be hosted on the network controller, the network controller being one of a plurality of network controllers in a Software-Defined Wide Area Network (SD-WAN), the network controller having a tenant list identifying the at least two tenants hosted on the network controller;
send, to other network controller appliances of the plurality of network controllers, a tenant list query message to obtain a corresponding tenant list of each of the other network controllers; and
receive a corresponding response from each of the other network controllers indicating the corresponding tenant list of each of the other network controllers, the response being used to update the tenant list on the network controller to yield an updated tenant list.

16. The one or more non-transitory computer-readable media of claim 15, wherein the corresponding response from each of the other network controller appliances includes a current list of tenants hosted on a corresponding one of the other network controller appliances, a corresponding tenant digest list, and a corresponding tenant count.

17. The one or more non-transitory computer-readable media of claim 15, wherein the execution of the computer-readable instructions cause the network controller to send the tenant list query message when a new tenant is added to one of the plurality of network controllers or when an existing tenant is deleted from one of the plurality of network controllers.

18. The one or more non-transitory computer-readable media of claim 15, wherein the tenant list query message is sent periodically.

19. The one or more non-transitory computer-readable media of claim 15, wherein the execution of the computer-readable instructions further cause the network controller to:
create, for each of the at least two tenants, a corresponding workflow between corresponding edge devices of each tenant and at least two network controllers assigned to each tenant, the corresponding workflow being used for exchange of network traffic to and from devices associated with a corresponding one of the at least two tenants.

20. The one or more non-transitory computer-readable media of claim 15, wherein the execution of the computer-readable instructions further cause the network controller to:
form connections, by a second network controller, for each tenant in the updated tenant list to facilitate an exchange of routing information, wherein the second network controller in a global namespace is multi-tenant aware and is configured to multiplex and demultiplex overlay management protocols (OMP) packets; and
performing an OMP exchange of the connections among the plurality of network controllers.

* * * * *